United States Patent [19] [11] 3,920,722
Mahan et al. [45] Nov. 18, 1975

[54] OLIGOMERIZATION PROCESS

[75] Inventors: John E. Mahan; Lloyd E. Gardner, both of Bartlesville, Okla.

[73] Assignee: Phillips Petroleum Company, Bartlesville, Okla.

[22] Filed: June 24, 1974

[21] Appl. No.: 482,255

[52] U.S. Cl. ................ 260/465.8 D; 260/465.8 D
[51] Int. Cl.² ............. C07C 120/00; C07C 121/20
[58] Field of Search ............................ 260/465.8 D

[56] References Cited
UNITED STATES PATENTS
3,567,760  3/1971  Feldman et al. ............ 260/465.8 D
3,733,351  5/1973  Watanabe et al. ........... 260/465.8 D Primary Examiner—Joseph P. Brust

[57] ABSTRACT

Dimers and trimers of acrylonitrile and methacrylonitrile are prepared by reacting the unsaturated nitrile in the presence of a catalyst system consisting of the zinc or cobalt salt of trifluoromethanesulfonic acid and a trialkylamine.

7 Claims, No Drawings

OLIGOMERIZATION PROCESS

This invention relates to the oligomerization of unsaturated nitriles. In one aspect this invention relates to the dimerization of acrylonitrile.

Various processes are known for the catalytic oligomerization of unsaturated nitriles. Various catalysts are known as being suitable for such processes. As an example, acrylonitrile can be dimerized to 2-methyleneglutaronitrile using a tertiary phosphine as the catalyst.

It is an object of this invention to provide a novel process for the oligomerization of unsaturated nitriles.

Other objects, aspects, and advantages of this invention will be readily apparent to those skilled in the art from the reading of the following disclosure.

In accordance with the present invention, there is provided a process for the oligomerization of unsaturated nitriles having the general formula

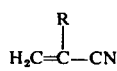

wherein R is —H or —CH$_3$, which comprises reacting acrylonitrile or methacrylonitrile in the presence of a catalyst system consisting of (A) the zinc or cobalt salt of trifluoromethanesulfonic acid and (B) a trialkylamine having the general formula R'$_3$N, wherein each R' is individually selected from the group consisting of alkyl radicals having from 1 to 8 carbon atoms.

As used herein, the term "oligomerization" is intended to mean the production of lower members of a polymer series, i.e., dimers, trimers and the like. Thus, a dimer is an oligomer containing two monomeric units; a trimer contains three monomeric units, and so on.

The cobalt or zinc trifluoromethanesulfonate can be prepared by any suitable method such as by reacting trifluoromethanesulfonic acid with zinc carbonate or cobalt carbonate.

Examples of trialkylamines suitable for use in the process of this invention include: trimethylamine, triethylamine, trioctylamine, tripropylamine, tributylamine, trihexylamine, methyldiethylamine and the like and mixtures thereof.

It has been found that a suitable quantity of the catalyst of the invention to be used relative to the unsaturated nitrile is such that the amount of the zinc or cobalt trifluoromethanesulfonate is from 0.5 to 25 weight percent based on the unsaturated nitrile. In a presently preferred embodiment, the metal trifluoromethanesulfonate is employed in an amount ranging from 2 to 15 weight percent.

The above described two components are used in proportions determined in accordance with the desired reaction. In general, the trialkylamine/metal trifluoromethanesulfonate mol ratio is from 0.1:1 to 20:1. In a presently preferred embodiment the mol ratio is in the range of 0.5:1 to 10:1.

The process of this invention is carried out batchwise or in continuous fashion, in the liquid phase, preferably under anhydrous conditions and in an inert atmosphere. Any procedure which provides sufficient contact between the catalyst and the reactant can be used. A reaction solvent is not necessary. If desired, however, a solvent such as a nitrile or aromatic hydrocarbon can be used. Examples of suitable solvents are acetonitrile, propionitrile, benzonitrile, benzene, toluene, xylene and the like.

The reaction time will vary broadly over the range of from 0.1 to 150 hours.

The reaction temperature and pressure should be sufficient to maintain the reactant in the liquid phase. Generally, a temperature of from about 0°C to about 70°C at atmospheric pressure can be employed.

When desired for the purpose of preventing the production of high polymers of acrylonitrile or methacrylonitrile, a polymerization inhitibor such as hydroquinnone or p-methoxyphenol, which will not impair the oligomerization reaction can also be used.

Subsequent to reaction, the product mixture is recovered and separated by conventional means, as by fractional distillation of the product mixture following removal of unreacted starting material which can then be recycled.

The products of the process of this invention are acyclic dimers and trimers of acrylonitrile and methacrylonitrile. The major product in the oligomerization of acrylonitrile is a branched isomer, i.e., 2-methyleneglutaronitrile, which is a useful intermediate in the production of polymers, when copolymerized with monomers such as acrylonitrile, styrene and butadiene. The products of the process of this invention are also useful as intermediates in the production of the corresponding amines. They can also be hydrolyzed to the corresponding amides.

The following examples illustrate the invention

EXAMPLE I

A mixture of 4.9 g (0.014 mol) cobalt(II) trifluoromethanesulfonate and 50 ml (40.6 g, 0.76 mol) of inhibitor-free acrylonitrile was placed in a 100 ml three-necked round-bottom flask equipped with a stirrer, thermometer, addition funnel, and nitrogen inlet tube. The reaction vessel was chilled in an ice bath and over a period of about 5 minutes, 8 ml (5.9 g, 0.058 mol) triethylamine was added to the stirred mixture. On addition of the triethylamine, the color of the reaction mixture changed from dark red to almost black. After a reaction period of about 96 hours at 0°C, the glc analysis showed (area %) 36.4% acrylonitrile, 53.3% 2-methyleneglutaronitrile (dimer) and 10.3% 2,4,6-tricyano-1-hexene (trimer).

EXAMPLE II

The reaction was carried out at 20°C in essentially the same manner as described in Example I. The charge consisted of 100 ml (81.1 g, 1.53 mols) of inhibitor-free acrylonitrile, 10.0 g (0.0277 mol) zinc trifluoromethanesulfonate and 16 ml (11.7 g, 0.116 mol) of triethylamine. On addition of the triethylamine to the acrylonitrile-zinc trifluoromethanesulfonate mixture, the temperature momentarily increased to 30°–32°C. and the initially yellow solution became a light orange-yellow color. The temperature was about 20°C during the 7-hour reaction period. After a reaction period of about 90.6 hours at 20°C the glc analysis showed (area %) 32.1% acrylonitrile, 57.2% 2-methyleneglutaronitrile (dimer) and 10.7% 2,4,6-tricyano-1-hexene (trimer).

Reasonable variations and modifications are possible within the foregoing disclosure without departing from the spirit and scope thereof.

We claim:

1. A process for producing a mixture of 2-methyleneglutaronitrile and 2,4,6-tricyano-1-hexene which consists essentially of catalytically reacting acrylonitrile in the presence of a catalyst system consisting of (A) the zinc or cobalt salt of trifluoromethanesulfonic acid and (B) a trialkylamine wherein each alkyl, individually, has from 1 to 8 carbon atoms, under conditions of temperature and pressure sufficient to maintain said nitrile in the liquid phase.

2. The process of claim 1 wherein said salt (A) is employed in an amount ranging from 0.5 to 25 weight percent of said nitrile.

3. The process of claim 2 wherein the molar ratio of said amine (B) to said salt (A) is in the range of 0.1:1 to 20:1.

4. The process of claim 1 wherein said salt (A) is zinc trifluoromethanesulfonate and said amine (B) is triethylamine.

5. The process of claim 1 wherein said salt (A) is cobalt trifluoromethanesulfonate and said amine (B) is triethylamine.

6. The process of claim 1 wherein said temperature is in the approximate range of 0° to 70°C and said pressure is atmospheric.

7. The process of claim 1 wherein said product mixture is separated and said 2-methyleneglutaronitrile is recovered therefrom as one product of said process, and 2,4,6-tricyano-1-hexene is recovered therefrom as a second product of said process.

* * * * *